United States Patent
Namuduri et al.

(10) Patent No.: US 10,040,649 B2
(45) Date of Patent: Aug. 7, 2018

(54) ELECTRODYNAMIC APPARATUS AND METHOD FOR SEPARATING NON-FERROUS CONDUCTIVE BLANKS

(71) Applicant: GM GLOBAL TECHNOLOGY OPERATIONS LLC, Detroit, MI (US)

(72) Inventors: Chandra S. Namuduri, Troy, MI (US); Thomas W. Nehl, Shelby Township, MI (US); James J. Abramczyk, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 84 days.

(21) Appl. No.: 15/364,563

(22) Filed: Nov. 30, 2016

(65) Prior Publication Data
US 2017/0163132 A1   Jun. 8, 2017

Related U.S. Application Data

(60) Provisional application No. 62/363,539, filed on Jul. 18, 2016, provisional application No. 62/263,094, (Continued)

(51) Int. Cl.
*B65H 3/16* (2006.01)
*B65G 59/04* (2006.01)
(Continued)

(52) U.S. Cl.
CPC .............. *B65H 3/16* (2013.01); *B25J 9/1687* (2013.01); *B65G 54/02* (2013.01); *B65G 59/04* (2013.01); *H02K 15/02* (2013.01); *H02K 41/025* (2013.01)

(58) Field of Classification Search
CPC ........ B65G 59/04; B65G 54/02; B25J 9/1687; H02K 15/02; H02K 41/025; B65H 3/16
(Continued)

(56) References Cited

U.S. PATENT DOCUMENTS 4,815,916 A * 3/1989 Beck .................. B65G 59/04
271/154
5,651,541 A   7/1997 Prime
(Continued)

FOREIGN PATENT DOCUMENTS

| CN | 1426160 A | 6/2003 |
| CN | 102801234 A | 11/2012 |
| CN | 103199641 A | 7/2013 |

*Primary Examiner* — David H Bollinger
(74) *Attorney, Agent, or Firm* — Quinn IP Law

(57) ABSTRACT

An electrodynamic apparatus for separating electrically conductive, non-ferrous, blanks includes a linear induction machine (LIM) stator, a polyphase power source, and a controller. Stator slots are wound with polyphase AC windings. The power source outputs a polyphase voltage or current. The controller supplies the windings with the voltage or current via the power source to induce an electric current in an uppermost blank and produce a traveling wave magnetic field. The electric current and magnetic field generate a force on the uppermost blank sufficient for separating the uppermost blank from an adjacent blank in the stack. A method for separating the blanks includes positioning the stack with respect to the apparatus and supplying the windings with AC voltage or current via the power source to generate the traveling wave magnetic field and induce the electric current, and ultimately generate the force on the uppermost blank.

17 Claims, 4 Drawing Sheets

Related U.S. Application Data filed on Dec. 4, 2015, provisional application No. 62/263,097, filed on Dec. 4, 2015.

(51) Int. Cl.
    *B25J 9/16*         (2006.01)
    *H02K 15/02*      (2006.01)
    *H02K 41/025*     (2006.01)
    *B65G 54/02*      (2006.01)

(58) Field of Classification Search
    USPC .......................................................... 271/18.1
    See application file for complete search history.

(56) References Cited

U.S. PATENT DOCUMENTS

| | | |
|---|---|---|
| 5,669,156 A | 9/1997 | Vejchoda |
| 6,481,706 B1 | 11/2002 | Gaeddert et al. |
| 6,746,063 B1 | 6/2004 | Sanchez |

\* cited by examiner

ELECTRODYNAMIC APPARATUS AND METHOD FOR SEPARATING NON-FERROUS CONDUCTIVE BLANKS

CROSS-REFERENCE TO RELATED APPLICATIONS

This application claims the benefit of U.S. Provisional Application No. 62/263,094, filed on Dec. 4, 2015, U.S. Provisional Application No. 62/263,097, filed on Dec. 4, 2015, and U.S. Provisional Application No. 62/363,539, filed on Jul. 18, 2016, all of which are incorporated by reference in their respective entireties and for all purposes.

INTRODUCTION

The present disclosure relates generally to automated systems for handling non-ferrous, electrically conductive objects. More specifically, aspects of the disclosure pertain to automated apparatuses, systems, and related methods for electrodynamically separating non-ferrous, electrically conductive sheet metal or composite blanks during handling and processing. In an example stamping operation, for instance, such blanks are automatically fed into a stamping press via operation of a material handling robot. A tool and die surface of the stamping press thereafter forms the received blanks into a desired shape. To facilitate the stamping operation, a stack of identically configured blanks is positioned in proximity to the stamping press. An end-effector of the robot is moved into position above the stack of blanks. The uppermost blank is then grasped and lifted from the stack via the end-effector and fed into the stamping press.

SUMMARY

The present disclosure pertains to an electrodynamic apparatus and related method for separating electrically conductive, non-ferrous conductive blanks during a stamping operation, or during any other operation in which it is desirable to separate an uppermost blank from a stack of such blanks. The apparatus energizes polyphase alternating current (AC) windings of a linear induction machine (LIM) stator positioned adjacent to an edge of the stack. Energizing of the LIM stator generates a traveling wave magnetic field which in turn induces an electric current in an uppermost one of the blanks via the LIM principle. The induced current in the uppermost blank interacts with the traveling wave magnetic field to generate a lifting force sufficient for separating or aiding separation of the uppermost blank from an adjacent blank, and thus from the remainder of the stack. As a result, the present approach is intended to reduce or eliminate reliance on compressed air, surface dimples, or other blank separation methodologies.

In a particular embodiment, the apparatus includes a polyphase LIM stator, a polyphase voltage or current supply, and a controller. The LIM stator may be positioned with respect to a corner or edge of the stack, with two LIM stators used at opposite corners along a common edge of the stack in a particular embodiment. Alternatively, multiple LIM stators may be positioned along the common edge, along opposite sides, or in a staggered arrangement along the edges of the stack.

The controller is programmed to command, via the power source, a polyphase voltage or current to phase windings of the polyphase LIM stator, with the polyphase voltage or current having a fixed or variable amplitude and frequency. This produces the traveling wave magnetic field noted above, thereby inducing the electric current in the uppermost blank. Together with the induced electric current, the traveling wave magnetic field generates a lifting force on the uppermost blank with a magnitude sufficient for separating the uppermost blank from the stack.

The polyphase LIM stator has at least three slots. In one possible configuration the polyphase voltage or current has three phases and the polyphase LIM stator has at least six slots.

A method is also disclosed for separating electrically conductive, non-ferrous conductive blanks arranged in a stack. The method includes positioning an edge of a stack of the blanks adjacent to an electrodynamic apparatus having a LIM stator. The LIM stator defines stator slots wound with polyphase AC windings. Additionally, the method includes supplying the AC windings of the LIM stator with an AC voltage or current via a polyphase power source to produce a traveling wave magnetic field and also induce an electric current in an uppermost blank of the stack. As part of the method, a lifting force is generated on the uppermost blank using the induced electric current and the traveling wave magnetic field, with the force having a magnitude sufficient for separating the uppermost blank from an adjacent blank in the stack.

The above-noted features and advantages and other features and advantages of the present disclosure are readily apparent from the following detailed description of the best modes for carrying out the disclosure when taken in connection with the accompanying drawings.

Figure 1:
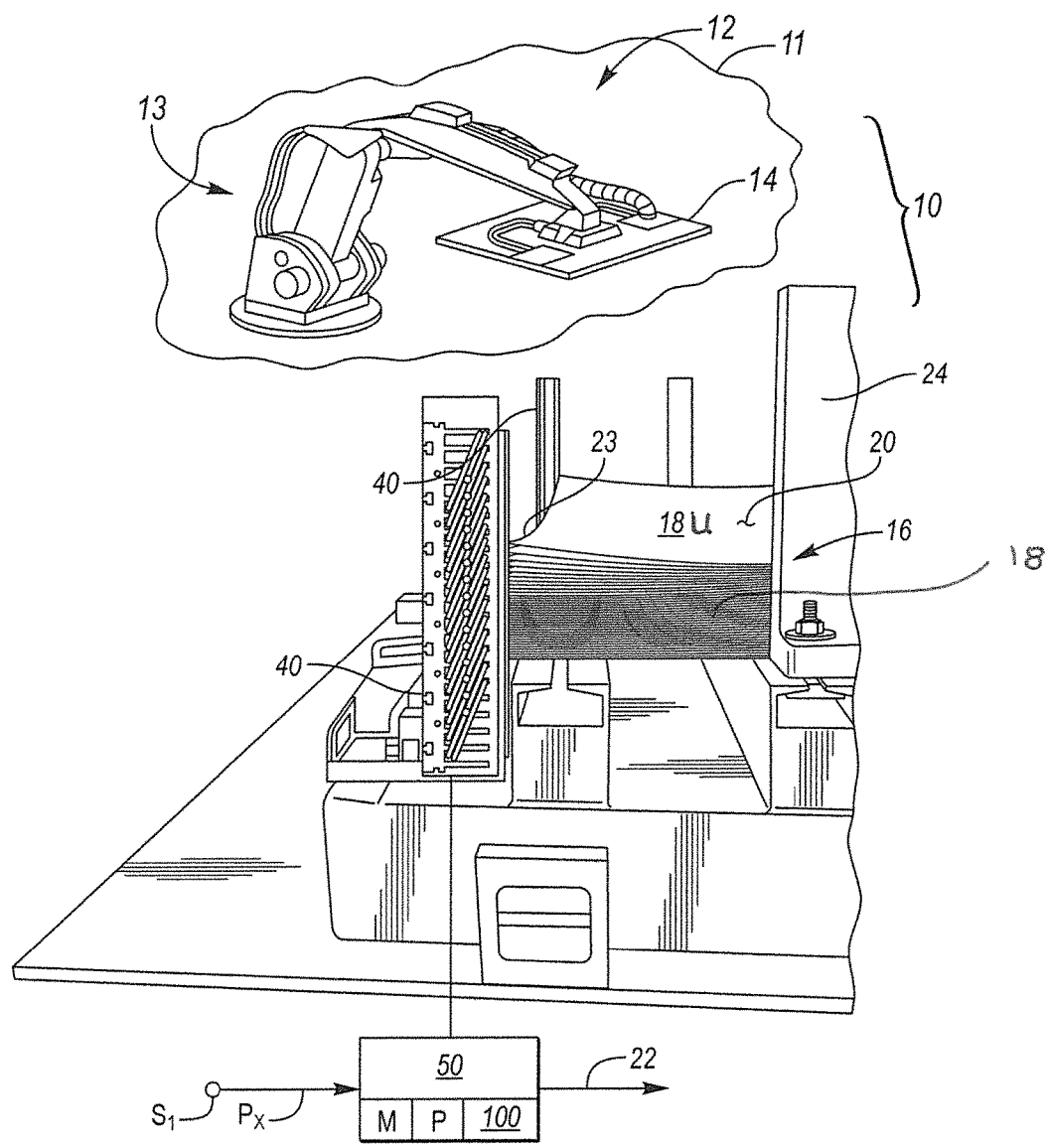
FIG. 1 is a schematic illustration of a system having an example electrodynamic apparatus for separating electrically-conductive, non-ferrous blanks.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the Drawings. Rather, the disclosure is to cover all modifications, equivalents, permutations, combinations, sub-combinations, and alternatives falling within the spirit and scope of the disclosure as defined by the appended claims.

DETAILED DESCRIPTION

Figure 5:
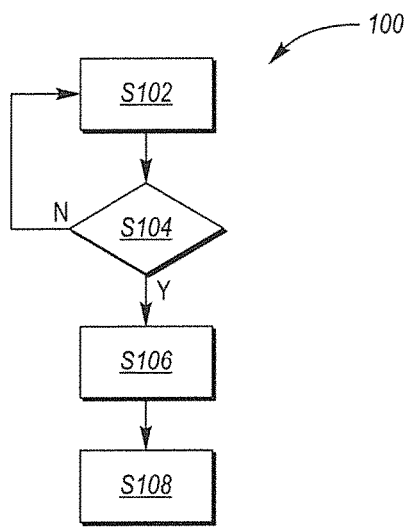
FIG. 5 is a flow chart depicting an example method for separating electrically-conductive, non-ferrous blanks using the electrodynamic apparatus shown in FIG. 1.

Referring to the drawings, wherein like numerals indicate like components throughout the several views, an electrodynamic system 10 is shown in FIG. 1 according to a possible example embodiment. The system 10 may be used as part of a stamping operation in a manufacturing process using electrically-conductive, non-ferrous blanks 18, i.e., flat panels or sheets of an electrically-conductive, nonmagnetic material such as aluminum, magnesium, or laminated plastic and/or composite materials having a conductive layer. The system 10, elements of which may be controlled via a controller 50 using an example method 100 as shown in FIG. 5, is intended to eliminate the need for separating non-ferrous blanks using compressed air, edge dimpling, or other separation techniques.

As noted generally above, a stamping press operation may use a material handling robot 12, portions of which are shown in FIG. 1 in a schematic inset 11 for illustrative simplicity. Such a robot 12 may include a robot arm 13 and an end-effector 14. In the particular configuration shown, the end-effector 14 may be supplied with a vacuum via a hose 15 such that the end-effector 14 can apply a suction force to a major surface 20 of an uppermost blank 18U in a stack 16 of identically configured blanks 18, and thereby securely grasp and lift the uppermost blank 18U. Other embodiments may include grippers that directly grasp the blanks 18, or the use of a high-speed belt-fed system (not shown) in lieu of the robot 12. The uppermost blank 18U lifted by the end-effector 14 is then fed into a stamping press (not shown), with the robot arm 13 pivoting back and forth between the stamping press and the stack 16 until all of the blanks 18 in the stack 16 have been sequentially fed into the press.

The system 10 shown in FIG. 1 includes one or more electrodynamic apparatuses 40 each operable for separating the blanks 18 via a separation force produced from a generated magnetic field and an induced electric current. As described below with reference to FIGS. 2-4, each electrodynamic apparatus 40 may include an elongated linear induction machine (LIM) stator 41 positioned with respect to a corner of the stack 16. Two such electrodynamic apparatuses 40 may be positioned at different corners of the stack 16 along a common edge 23 of the stack 16. A linear induction machine or LIM is a special purpose motor that can be used to achieve rectilinear motion. In general, when the LIM stator 41 of the electrodynamic apparatus 40 is electrically excited by a balanced polyphase power supply, a traveling magnetic flux wave is generated that propagates along a surface 49 (see FIG. 3) of the LIM stator 41 facing the blanks 18. As a result, an electric current is induced in the blanks 18. The induced electric current interacts with the traveling wave magnetic field to produce a linear force normal the stack 16, which is applied to the stack 16 herein as a lifting force (F) as shown in FIG. 3, thereby gently separating the uppermost blank 18U from the blanks 18 in the remainder of the stack 16.

As only one edge of the uppermost blank 18U is required to be lifted from the stack 16 to sufficiently facilitate grasping of the uppermost blank 18U by the end-effector 14, a pair of the apparatuses 40 may be positioned at different corners of the stack 16 along a common edge 23 of the stack 16, with a support 24 such as a steel column used at the other two corners maintaining a desired alignment of the stack 16 such that the blanks 18 are evenly stacked.

Force (F) is equal to the product of a magnetic field (B), an electric current (I), and a length (L) of a given electrical conductor, in this instance the material of the uppermost blank 18U, i.e., F=B×I×L. This fundamental electromagnetic principle is harnessed via the method 100 to produce a "blank fanning" effect in which the force (F) is produced in a controlled and targeted manner via the electrodynamic apparatus 40 to separate the blanks 18 from each other without the need for compressed air or other separation techniques.

As part of an example stamping operation, an optional position sensor S1 may be used to detect a position of the end-effector 14 with respect to the uppermost blank 18U, with the detected position (arrow Px) transmitted to a controller 50. The sensor S1 may be any suitable position sensor, such as but not limited to a Hall effect sensor or rotary encoder. The controller 50, e.g., one or more computer devices having sufficient memory (M), a processor (P), and computer-executable instructions embodying the method 100 as set forth below with reference to FIG. 5, may be in communication with the material handling robot 12, e.g., with a separate robot controller or motor control processor, and programmed to receive the position (arrow Px).

The controller 50 of FIG. 1 can then transmit a set of control signals (arrow 22) to the electrodynamic apparatus 40 as explained below with reference to FIGS. 2-4 to generate the above-noted traveling wave magnetic field within the stack 16. In this way, control of the apparatus 40 with respect to the stack 16 may be closely coordinated with the overall motion of the material handling robot 12, such as via closed-loop or open-loop feedback control. Likewise, the control signals (arrow 22) may cause energizing only of certain portions of the apparatus 40 as the blanks 18 are consumed in the stamping process and the height of the stack 16 gradually decreases.

Figure 2:
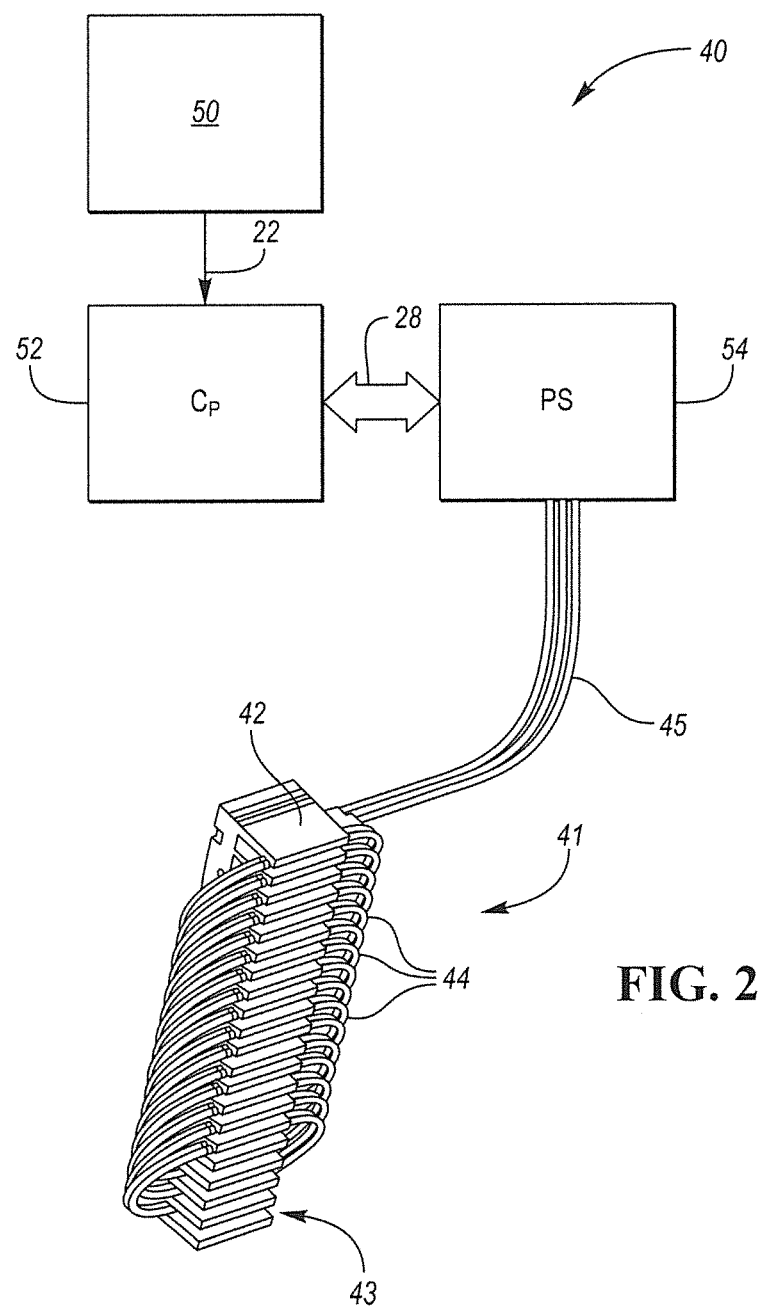
FIG. 2 is a schematic illustration of an example electrodynamic apparatus usable within the system of FIG. 1.
Figure 3:
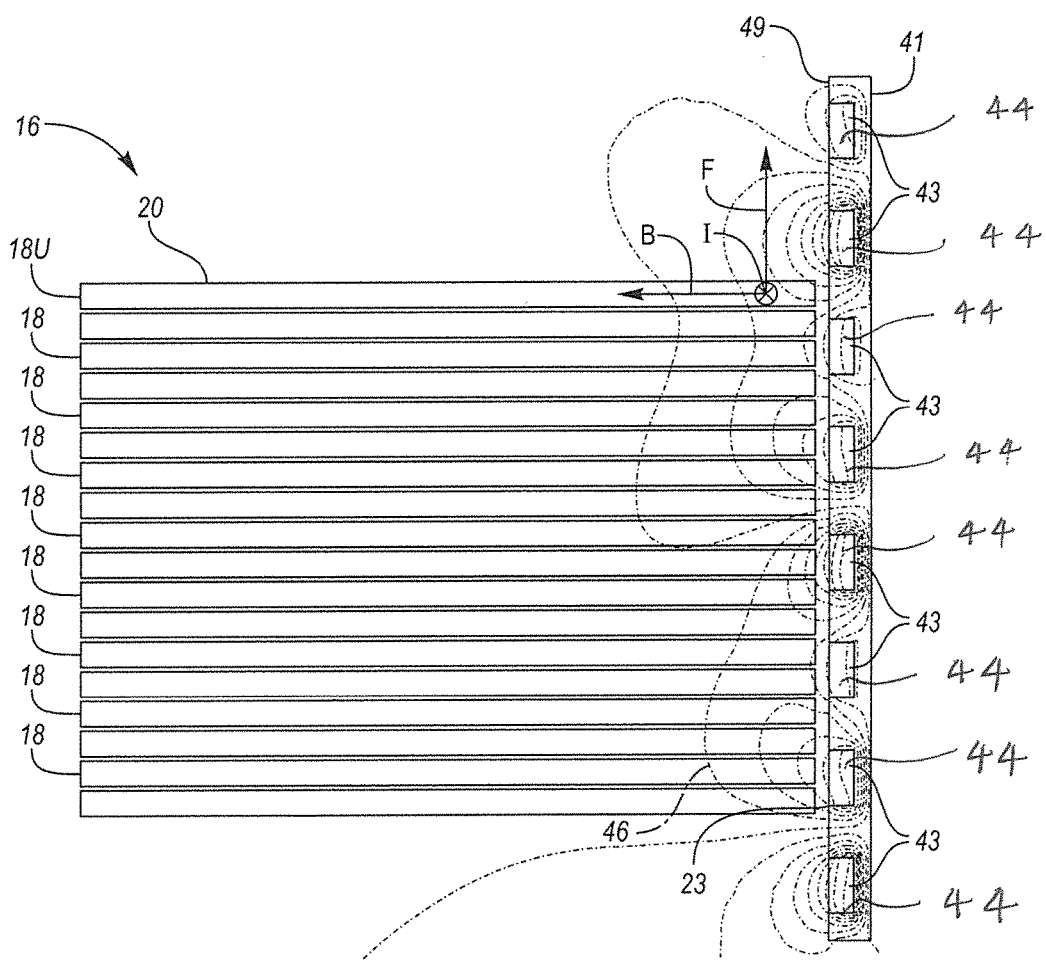
FIG. 3 is a schematic illustration of the electrodynamic apparatus and a stack of electrically-conductive, non-ferrous blanks, with a generated magnetic field and current densities depicted with respect to the blanks.

FIG. 2 schematically depicts the apparatus 40, which may include an elongated LIM stator 41, the controller 50, and an alternating current (AC) power supply (PS) 54. The apparatus 40 may include a process controller ($C_P$) 52, or the processor controller 52 may be integrated with the controller 50 into a single controller. If the controllers 50 and 52 are separate devices, the process controller 52 may be programmed to control the overall process of lifting and feeding the blanks 18 into a stamping press, and the controller 50 may be programmed to coordinate powering of the apparatus 40 with the overall sequence of the stamping press operation. The process controller 52 is in communication with the AC power supply 54, as indicated in FIG. 2 by double-headed arrow 28, which may be embodied as a polyphase fixed voltage/fixed frequency (FVFF) or variable voltage/variable frequency (VVVF) power source in different embodiments.

The LIM stator 41 shown in FIG. 2 has a stator core 42 constructed, e.g., of laminated steel or soft magnetic composite material such as powdered iron. The stator core 42 defines a plurality of stator slots 43 wound with stator windings 44 as shown. A pole pitch-to-pole width ratio of the LIM stator 41 may be at least 0.1 for optimal performance. The stator windings 44 are electrically connected to the AC power supply 54 via an electrical cable 45 as shown. As commanded by the controller 50 and/or the control processor 52, the stator windings 44 may be excited with an AC voltage or current from the AC power supply 54, and thus with a fixed or variable frequency or amplitude, so as to induce an electric current (I) in the stack 16, as best shown in FIG. 3. The stator core 42 may have at least three stator slots 43 in a possible embodiment, and may be excited with a polyphase voltage or current having at least two phases. In another embodiment, the stator core 42 may have at least six stator slots 43 and may be excited with a polyphase voltage or current having at least three phases. Excitation of the windings 44 in turn produces a traveling wave magnetic field along the surface of the LIM stator 41 and within the stack 16 shown schematically in FIG. 1.

Production of the traveling wave magnetic field is described in further detail with reference to FIGS. 3 and 4. FIG. 3 depicts the elongated LIM stator 41 positioned in close proximity to the stack 16 of blanks 18. When the stator windings 44 of the LIM stator 41 are energized via the AC power supply 54 of FIG. 2, the electric current (I) is induced in the stack 16 in proximity to each winding 44. A magnetic field (B), with its magnetic flux lines 37 shown at an instant in time in FIG. 3, is generated in a direction normal to that of the induced electric current (I). That is, as the magnetic flux exemplified by the flux lines 37 changes with the changing amplitudes of the various phase currents, the magnetic flux moves with respect to the stator windings 44 as a traveling wave magnetic field. The electric current (I) is induced in a direction that is transverse to the edge 23 of the stack 16 that is adjacent to the apparatus 40, i.e., into the page as viewed from the perspective of FIG. 3, while the magnetic field (B) is transmitted in a direction away from the electrodynamic apparatus 40 and normal to the direction of the induced electric current (I). A current density 46 in the stack 16 that is opposite to each of the stator windings 44 will also change as the phase currents supplied to the stator windings 44 alternate in amplitude, thereby affecting the traveling wave magnetic field (B). Ultimately, the traveling wave magnetic field (B) will react against the induced electric current (I) in the blanks 18 of the stack 16 with a force (F), which in turn will tend to lift the uppermost blank 18U from the remainder of the stack 16.

Figure 4:
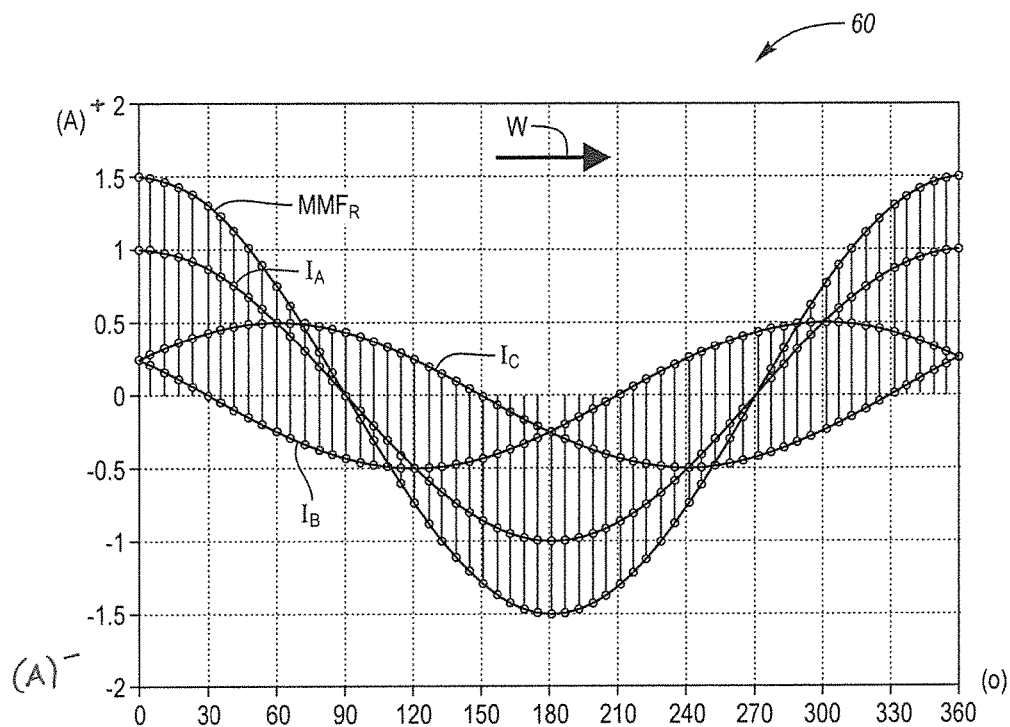
FIG. 4 is a plot of a wave space distribution, with angular position depicted on the horizontal axis and magnitude depicted on the vertical axis.

A wave space distribution 60 is depicted in FIG. 4 for an example three-phase configuration of the electrodynamic apparatus 40 at a given instant in time, with phase angle (°) depicted on the horizontal axis and normalized amplitude (A) depicted on the vertical axis. As the three phase currents $I_A$, $I_B$, and $I_C$ oscillate out of phase with respect to each other between a maximum and minimum amplitude ($A^+$ and $A^-$, respectively), a resultant magnetomotive force ($MMF_R$) will be produced in the direction of arrow W. As a result, the magnetic flux indicated as lines 37 in FIG. 3 will move upward in the stack 16 of FIGS. 1 and 3 as a traveling wave magnetic field, such that the force (F) falls incident upon the uppermost blank 18U. As noted above, the force (F) is determined as the product of the magnetic field (B), electric current (I), and conductor length (L), i.e., F=B×I×L.

That is, all of the blanks 18 in the stack 16 will experience the force (F), but the uppermost blank 18U, being the only blank 18 in the stack 16 that is not opposed from above by an adjacent blank 18, will tend to move unopposed in the direction of the force (F). Depending on the force (F), actual separation may result such that a temporary gap forms between the uppermost blank 18U and the next blank 18 in the stack 16. For instance, separation of the uppermost blank 18U may be achieved of about 10-20 mm, and not more than the width of the magnets being used, e.g., less than about 50 mm. If the uppermost blank 18U remains in contact with the next blank 18, the force (F) remains sufficient for urging the uppermost blank 18U away from the next blank 18 when the uppermost blank 18U is grasped and lifted by the end-effector 14 shown in FIG. 1.

In an illustrative example, the stack 16 of FIGS. 1 and 3 may include about 350-400 blanks 18 each constructed of aluminum sheets that are approximately 0.80-1.2 mm thick and about 6.50-7.0 kg in weight. A typical rectangular blank 18 may have major dimensions of about 1.475 m×1.835 m. For aluminum blanks 18 having the above specifications, a force (F) of about 17 Newtons is required at two corners of the blank 18 along the common edge 23 to facilitate separation of the uppermost blank 18U sufficient for subsequent lifting by the end-effector 14. Based on this, the required magnetic field (B) may be readily determined for a given application, and the apparatus 40 tuned to provide the magnetic field (B), as will be appreciated by one of ordinary skill in the art.

Likewise, an air gap between the apparatus 40 and the stack 16 of blanks 18 affects the force (F). For instance, increasing such an air gap from ⅛" to ⅜" may decrease the force (F) by approximately half. The excitation frequency of the stator windings 44 also affects the force (F). For instance, for a 400 VAC, 3-phase, 4-pole configuration with a ⅜" air gap applied to aluminum blanks 18 that are ⅛" thick, the excitation frequency may be less than 60 Hz, e.g., between 40-60 Hz. The duty cycle of the LIM stator 41 of FIG. 2 also affects the force (F), with the duty cycle being less than 25% or between 5% and 25% in an example embodiment. As a result of the low duty cycle for the intended application, the LIM stator 41 and its associated cost may be minimized.

Referring to FIG. 5, an example embodiment is depicted of the method 100 for electrodynamically separating the blanks 18 described above using the electrodynamic apparatus 40 of FIG. 1. The method 100 begins with step S102, wherein the electrodynamic apparatus 40 is positioned adjacent to the stack 16 of blanks 18, for instance with one electrodynamic apparatus 40 positioned at a respective corner of the stack 16 along the common edge 23. For instance, a pallet containing the stack 16 may be positioned on a non-metallic base such that the common edge 23 is adjacent to the electrodynamic apparatus 40. The method 100 proceeds to step S104 once the stack 16 is properly positioned with respect to the pair of apparatuses 40. The method 100 then proceeds to step S104.

Step S104 may entail determining if the end-effector 14 of FIG. 1 is in close proximity to the major surface 20 of the uppermost blank 18U. Step S104 may entail processing the position signals (arrow Px) for the sensor Sx via the controller 50 to determine if the end-effector 14 is about to make contact with the surface 20 of the uppermost blank 18U. In other embodiments, the process controller 52 of FIG. 2 may inform the controller 50 that the end-effector 14 is about to make contact with the major surface 20. The method 100 proceeds to step S106 when such contact is imminent.

At step S106, the stator windings 44 are supplied with an AC voltage or current via the power supply 54 of FIG. 2 such that the electric current (I) is induced in the stack 16. The traveling wave magnetic field (B) and the electric current (I) propagate in directions that are orthogonal to each other. The magnetic field (B) and electric current (I) interact to produce the required force (F), and thus step S106 entails generating the force (F) on the uppermost blank 18U using the induced electric current (I) and the traveling wave magnetic field (B). The force (F) has a magnitude sufficient for separating the uppermost blank 18U from an adjacent blank 18 in the stack 16. As part of the method 100, the end-effector 14 may be controlled via the controller 50 of FIG. 1 to lift the uppermost blank 18U, e.g., using suction or grippers.

Step S108 may entail controlling an operation of the electrodynamic apparatus 40 while the material handling robot 12 is in the process of feeding a blank 18 into a stamping press. Step S108 may entail energizing only designated portions of the LIM stator 41 as a height of the stack 16 decreases, i.e., as the blanks 18 are consumed. For instance, switches or relays (not shown) may be used to energize progressively lower portions of the LIM stator 41 such that an overall "active height" of the LIM stator 41 is gradually reduced in conjunction with reductions in the height of the stack 16. The robot 12 cycle time in moving between blanks 18 may be about 6 seconds, or as little as 2 seconds in a high-speed belt-feed system, thus requiring adjustment of the LIM stator 41 in such an embodiment within the window of time provided.

Using the electrodynamic apparatus 40 described above, aluminum or other non-ferrous, electrically conductive blanks 18 may be separated from each other without the use of compressed air or other separation techniques. By eliminating devices such as air knives or air nozzles for fanning of the blanks 18, it may be possible to avoid the cost, air cleanliness issues, and lockout requirements common to the use of compressed air as a plant utility, as well as to increase the throughput of a stamping press operation relative to conventional air-fanned methods. Throughput may be further increased by replacing the robot 12 of FIG. 1 with a high-speed belt feed system, e.g., by pulling the uppermost blank 18U onto a belt (not shown) after separating the uppermost blank 18U at the common edge 23.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. An electrodynamic apparatus for separating electrically conductive, non-ferrous blanks arranged in a stack, the electrodynamic apparatus comprising:
    a linear induction machine (LIM) stator positioned with respect to the stack, the LIM stator having a plurality of stator slots wound with polyphase alternating current (AC) stator windings;
    a polyphase power source operable for outputting a polyphase voltage or current; and
    a controller configured to command the power source to provide the stator windings of the LIM stator with the polyphase voltage or current to thereby produce a force on the uppermost blank, via generation of a traveling wave magnetic field in the stack and an induced electric current in an uppermost blank of the stack, wherein the force has a magnitude sufficient to separate the uppermost blank from an adjacent blank in the stack.

2. The electrodynamic apparatus of claim 1, wherein the LIM stator has at least three of the stator slots.

3. The electrodynamic apparatus of claim 2, wherein the polyphase voltage or current has three phases and the LIM stator has at least six of the stator slots.

4. The electrodynamic apparatus of claim 3, wherein the LIM stator includes a pair of LIM stators positioned at different corners of the stack along a common edge of the stack.

5. The electrodynamic apparatus of claim 1, wherein the power source is a variable voltage/variable frequency power source.

6. The electrodynamic apparatus of claim 1, wherein the power source is a polyphase fixed voltage/fixed frequency power source.

7. The electrodynamic apparatus of claim 1, further comprising an end-effector configured to grasp and lift the separated uppermost blank from the stack.

8. The electrodynamic apparatus of claim 7, further comprising a position sensor configured to detect a position of the end-effector with respect to the uppermost blank and transmit the detected position to the controller, and wherein the controller is configured to control an operation of the end-effector using the detected position.

9. The electrodynamic apparatus of claim 1, wherein the controller is configured to command energizing only of designated portions of the LIM stator as a height of the stack decreases.

10. A method for separating electrically conductive, non-ferrous conductive blanks arranged in a stack, the method comprising:
    positioning an edge of a stack of the blanks adjacent to an electrodynamic apparatus having a linear induction machine (LIM) stator, the LIM stator defining a plurality of stator slots wound with polyphase alternating current (AC) windings;
    supplying the AC windings of the LIM stator with an AC voltage or current via a polyphase power source to thereby produce a traveling wave magnetic field and induce an electric current in an uppermost blank of the stack;
    generating a force on an uppermost blank of the stack using the induced electric current and the traveling wave magnetic field, the force having a magnitude that is sufficient for separating the uppermost blank from an adjacent blank in the stack.

11. The method of claim 10, wherein supplying the AC windings of the LIM stator with an AC voltage or current includes supplying three AC voltage or current phases to at least six of the stator slots.

12. The method of claim 10, wherein positioning an edge of a stack of the blanks includes positioning a pair of the LIM stators at different corners of the stack along a common edge of the stack.

13. The method of claim 10, wherein the power source is a variable voltage/variable frequency power source.

14. The method of claim 10, wherein the power source is a polyphase fixed voltage/fixed frequency power source.

15. The method of claim 10, further comprising: grasping and lifting the separated uppermost blank from the stack using an end-effector.

16. The method of claim 15, further comprising: using a position sensor to detect a position of the end-effector with respect to the uppermost blank, transmitting the detected position to a controller, and controlling the end-effector in the grasping and lifting of the uppermost blank using the detected position.

17. The method of claim 10, further comprising: energizing only designated portions of the LIM stator as a height of the stack decreases.

* * * * *